United States Patent
Beebe et al.

(10) Patent No.: US 6,821,485 B2
(45) Date of Patent: Nov. 23, 2004

(54) METHOD AND STRUCTURE FOR MICROFLUIDIC FLOW GUIDING

(75) Inventors: David J. Beebe, Madison, WI (US); Jeffrey S. Moore, Savoy, IL (US); Bin Zhao, Urbana, IL (US)

(73) Assignees: Wisconsin Alumni Research Foundation, Madison, WI (US); The Board of Trustees of the University of Illinois, Urbana, IL (US)

( * ) Notice: Subject to any disclaimer, the term of this patent is extended or adjusted under 35 U.S.C. 154(b) by 230 days.

(21) Appl. No.: 10/071,846

(22) Filed: Feb. 8, 2002

(65) Prior Publication Data

US 2002/0182747 A1 Dec. 5, 2002

Related U.S. Application Data

(60) Provisional application No. 60/267,692, filed on Feb. 9, 2001.

(51) Int. Cl.[7] .............................. B01L 3/02; B01L 11/00; G01N 15/06; G01N 33/00; G01N 33/48
(52) U.S. Cl. ........................... 422/100; 422/50; 422/56; 422/57; 422/58; 422/68.1; 422/81; 422/82.05; 422/101; 422/102; 422/103; 422/104; 436/43; 436/52; 436/53; 436/63; 436/180
(58) Field of Search .............................. 422/50, 56, 57, 422/58, 68.1, 81, 82.05, 100–104, 55; 436/43, 52, 53, 63, 180

(56) References Cited

U.S. PATENT DOCUMENTS

| | | | |
|---|---|---|---|
| 5,904,824 A | | 5/1999 | Oh |
| 6,159,739 A | * | 12/2000 | Weigl et al. .................. 436/52 |
| 6,193,647 B1 | | 2/2001 | Beebe et al. |
| 6,344,325 B1 | * | 2/2002 | Quake et al. .................. 435/6 |
| 6,488,872 B1 | | 12/2002 | Beebe et al. |
| 6,561,208 B1 | * | 5/2003 | O'Connor et al. ....... 137/15.18 |

FOREIGN PATENT DOCUMENTS

| | | |
|---|---|---|
| EP | 1 040 874 A2 | 2/2000 |
| WO | WO 91/16966 | 11/1991 |
| WO | WO 98/22625 | 5/1998 |
| WO | WO 01/07506 | 2/2001 |

OTHER PUBLICATIONS

Beebe, et al., "Functionallized Hydrogel Structures for Autonomous Flow Control Inside Microfluidic Channels," Nature, vol. 404, Apr. 6, 2000, pp. 588–590.

Hartmut, Gau, et al., "Liquid Morphologies on Structured Surfaces: From Microchannels to Microchips," Science, vol. 283, Jan. 1999, pp. 46–49.

Anton A. Darhuber, et al., Journal of Applied Physics, vol. 87, No. 11 Jun. 2000, pp. 7768–7775.

(List continued on next page.)

*Primary Examiner*—Jill Warden
*Assistant Examiner*—Brian J. Sines
(74) *Attorney, Agent, or Firm*—Foley & Lardner

(57) ABSTRACT

A flow of liquids is carried out on a microscale utilizing surface effects to guide the liquid on flow paths to maintain laminar flow. No sidewall confining structure is required, minimizing resistance to flow and allowing laminar flow to be maintained at high flow rates. The guiding structure has flow guiding stripes formed on one or both of facing base and cover surfaces which are wettable by a selected liquid to direct the liquid from a source location to a destination location. The regions adjacent to the guiding stripes on the base and cover surfaces are non-wettable. The smooth interface between the gas and liquid along the flowing stream allows gas-liquid reactions to take place as a function of diffusion across the interface without mixing of the gas and liquid. Liquid-liquid flows may also be guided with such structures.

36 Claims, 10 Drawing Sheets

OTHER PUBLICATIONS

Michael G. Olson, et al., "Particle Imaging Technique for Measuring the Deformation Rate of Hydrogel Microstructures," Applied Physics Letters, vol. 76, No. 22, May 29, 2000, pp. 3310–3312.

David J. Beebe, et al., "Functional Hydrogel Structures for Autonomous Flow Control Inside Microfluidic Channels," Nature, vol. 404, Apr. 6, 2000, pp. 588–590.

U.S. patent application filed Jul. 21, 2000, by David J. Beebe and Jeffrey S. Moore, claiming priority from provisional application No. 60/145,554, filed Jul. 23, 1999, entitled Microfabricated Devices and Method of Manufacturing the Same (copy not enclosed), U.S. Pat. No. 6,488,872.

* cited by examiner

METHOD AND STRUCTURE FOR MICROFLUIDIC FLOW GUIDING

CROSS-REFERENCE TO RELATED APPLICATION

This application claims the benefit of provisional patent application No. 60/267,692, filed Feb. 9, 2001, the disclosure of which is incorporated by reference.

REFERENCE TO GOVERNMENT RIGHTS

This invention was made with United States government support awarded by the following agency: DOD ARPA F30602-00-2-0570. The United States government has certain rights in this invention.

FIELD OF THE INVENTION

This invention pertains generally to the field of fluid control devices and particularly to the formation and use of microfluidic systems.

BACKGROUND OF THE INVENTION

The manipulation of fluids in small volumes is required or desirable in many applications of microfluidic devices, including rapid bioassays, microchemical reactions, and chemical and biological sensing. For a review of such applications, see M. Freemantle, "Downsizing Chemistry," Chem. & Eng. News, Vol. 77, No. 8, 1999, pp. 27–36. A microfluidic handling system utilizing microchannels is described in U.S. Pat. No. 6,193,647 to Beebe, et al. A variety of techniques have been used to pump, transport, position, and mix small liquid samples. Examples of such techniques include electro-osmotic flow, electrowetting, electrochemistry, and thermocapillary pumping. Surface properties, particularly surface wetting properties, have a significant effect on liquid behavior when very small volumes of liquid are manipulated. Such surface effect or capillary force is the basis of capillary pumping. Studies of structured surfaces consisting of either hydrophilic and hydrophobic stripes or patterned positive and negative surface charges show phenomena which can be exploited to control liquid motions in microfluidic devices. See, H. Gau, et al., "Liquid Morphologies on Structured Surfaces: From Microchannels to Microchips," Science, Vol. 283, 1999, pp. 46–49; A. A. Darhuber, et al., "Morphology of Liquid Microstructures on Chemically Patterned Surfaces," J. Appl. Phys., Vol. 87, 2000, pp. 7768–7775; A. D. Strook, et al., "Patterning Electro-Osmotic Flow with Patterned Surface Charge," Phys. Rev. Lett., Vol. 84, 2000, pp. 3314–3317.

SUMMARY OF THE INVENTION

In accordance with the invention, flow of liquids is carried out on a microscale utilizing surface effects to control and direct the liquid. Liquid flow is guided by surface flow paths to maintain full laminar flow. The liquid stream can be supported and guided entirely by a flow path formed on facing surfaces such that the flowing stream is in contact only with the flow paths on the surfaces. Because the flowing stream is not in contact with other confining structure, such as sidewalls or the interior walls of channels or tubes, resistance to flow is minimized and laminar flow conditions may be maintained at higher flow rates. The surface tension of the flowing liquid provides vertical support for the stream of liquid, resulting in maximum exposure of the flowing stream to the atmosphere that surrounds it, thereby maximizing the surface area of gas-liquid interactions. Such microfluidically controlled streams may be utilized for applications such as chemical analysis, drug research, chromatography, cooling of electronic chips, flow sensors, air borne sample collection, and various medical applications including implantable drug dispensing systems and dialysis systems.

A microfluidic flow guiding structure for carrying out the invention includes a base having a surface and a cover with a surface facing the base surface. Adjacent facing regions on the base surface and cover surface define a flow path from a source position to a destination position on the base surface and cover surface, with at least a region on each of the base surface and cover surface being wettable by and having a wetting angle of less than 90° with respect to a selected liquid, the wettable region on at least one of the base surface and cover surface formed as a flow guiding strip and a region adjacent to the guiding stripe on the at least one of the base surface and cover surface being non-wettable by and having a wetting angle of greater than 90° with respect to the selected liquid. At such dimensions, a liquid injected onto the guiding stripe will be held by surface energy forces between the guiding stripe(s) on the base and cover surfaces and will flow along the stripe(s) from the source position to the destination position without flowing onto the non-wettable regions adjacent to the stripes. Further, the flow will remain laminar along the guiding stripes up to relatively high flow rates. The surface tension of the liquid itself creates a virtual wall that separates the liquid from the surrounding gas. Because of the smooth laminar flow of the liquid, there is no turbulence at the interface between the flowing liquid and the surrounding gas, and thus no intermixing of the liquid and gas occurs. The smooth interface between the gas and liquid phases along the flowing stream allows gas-liquid reactions to take place as a function of diffusion across the interface. Because the flowing stream is supported only at its bottom and top, the surface area of the flowing stream that is exposed to the ambient gas is maximized, and is much larger than the surface area per unit flow rate that can be obtained with liquid flowing through channels in contact with sidewalls or through channels formed in permeable membranes. Thus, chemical reactions between the gas and liquid can occur much more rapidly per unit volume by utilizing the present invention.

Two or more parallel guiding stripes that are separated by a non-wettable region may be formed on the base and cover surfaces to guide adjacent streams of liquid that flow together and that contact each other without mixing, but with diffusion allowed across the boundary between the two liquids.

The flow guiding stripes may be formed by various techniques, including lithography and the deposition of self-assembled monolayers by appropriately controlling flowing streams of liquid material, such as trichlorosilanes, which will form a non-wettable layer on the surface of the base. The flowing streams of material that deposit the monolayers may be guided by channels having a bottom wall and vertical walls that are formed in the base and closed by the cover surface, with the bottom wall of the channels defining the surface of the base on which the flow guiding stripes are formed.

Valves which control the flow of liquid on the flow guiding stripes may be formed in various manners, including as a barrier on the flow guiding stripe which blocks liquid flow below a selected pressure level; above that pressure level liquid on the guiding stripes will flow around the barrier. The valves may also be formed of materials that change dimension in response to characteristics of the liquid or that change over time from hydrophobic to hydrophilic or vice versa. Such materials include hydrogels that swell in response to certain conditions in the liquid to selectively block the flow on the guiding stripes.

Further objects, features and advantages of the invention will be apparent from the following detailed description when taken in conjunction with the accompanying drawings.

DETAILED DESCRIPTION OF THE INVENTION

Figure 1:
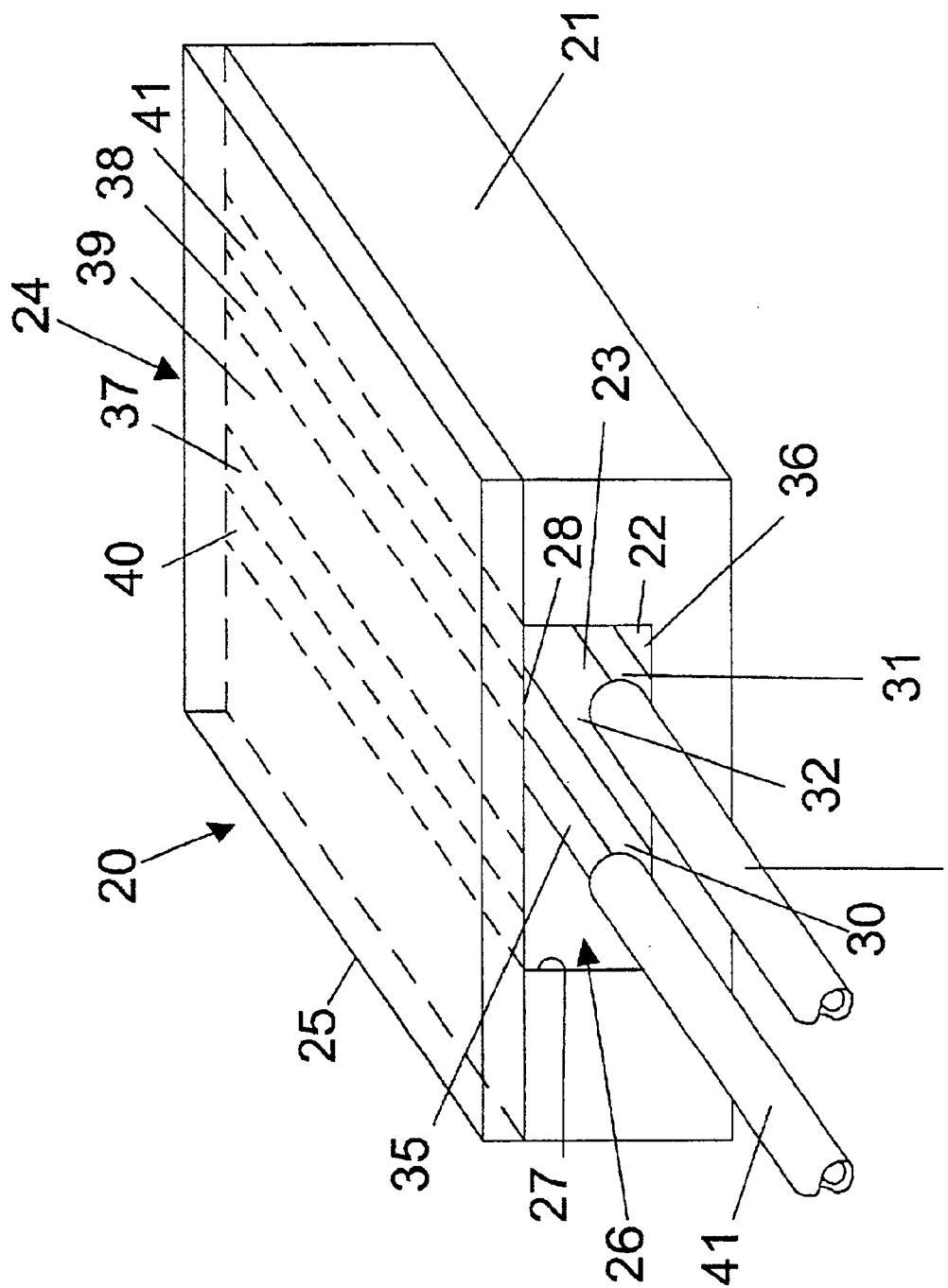
FIG. 1 is a simplified perspective view of a portion of a microfluidic flow guiding structure in accordance with the invention.

For purposes of illustrating the principles of the invention, a microfluidic flow guiding structure is shown generally at 20 in FIG. 1. The flow guiding structure includes a base 21 having a surface 22 on which at least one flow path extends from a source position (generally referenced at 23 in FIG. 1), to a destination position (referenced for illustrative purposes at 24 in FIG. 1). A cover 25 extends over the base 21. The base 21 and cover 25 can be made of a variety of solid materials, including plastics, glass, silicon or other semiconductors, photosensitive polymers, etc. Although a separate cover 25 is shown for illustration, the base and cover may be formed integrally, or of multiple parts, and of the same or different materials. A channel 26 is defined by the surface 22, as the bottom wall of the channel, by two sidewalls 27 which extend upwardly from the bottom wall 22, and by a cover surface 28 which is spaced from and faces the base bottom wall surface 27. In accordance with the invention, the channel 26 may be formed by any suitable technique, including micromachining techniques used in the production of microelectromechanical systems (MEMS) and in conventional semiconductor processing. The microfluidic structures of the present invention are generally formed at dimensions at which conventional machining processes are either not feasible at all or do not provide adequately precisely defined structures. It is also understood that a straight channel 26 is shown in FIG. 1 for illustrative purposes only, and that the microfluidic structures may have multiple channels of a wide variety of path configurations.

Figure 2:
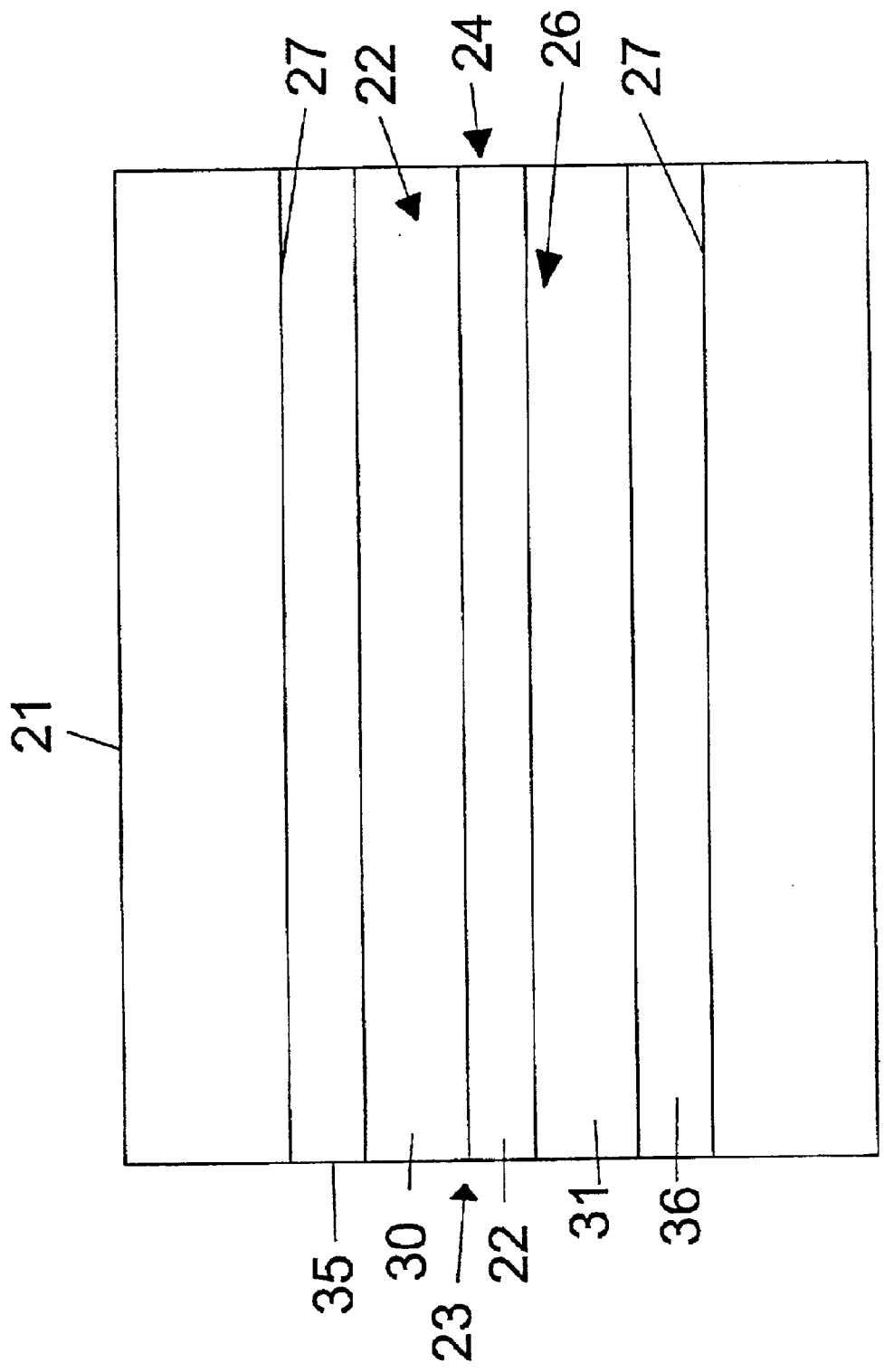
FIG. 2 is a top view of the base portion of the structure of FIG. 1.

For purposes of illustrating the invention, two flow guiding stripes 30 and 31 are formed on the base surface 22 extending from the source position 23 to the destination position 24. The flow guiding stripes 30 and 31 are selected to be wettable by and have a wetting angle of less than 90° with respect to a selected liquid. The parallel flow guiding stripes 30 and 31 are separated by a region 32 which is non-wettable by and has a wetting angle of greater than 90° with respect to the selected liquid. For illustration, additional regions 35 and 36, outwardly adjacent to the guiding stripe 30 and the guiding stripe 31, respectively, are formed on the base surface 22 and also are non-wettable by the selected liquid. Similar wettable flow guiding stripes 37 and 38, separated by a non-wettable region 39, with the stripes 37 and 38 spaced from the walls 27 by non-wettable regions 40 and 41, may be formed on the cover surface 28 adjacently spaced from and facing the stripes 30 and 31, respectively. The stripes 37 and 38 may be narrower, wider, or of the same width as the stripes 30 and 31. The present invention may be utilized with a flow guiding stripe or stripes formed on only one of the base or cover surfaces, with the other surface then being wettable with respect to the selected liquid. For illustration, tubes 41 and 42 are mounted to supply liquid to the space between the stripes 30 and 37 and the stripes 31 and 38, respectively, at the source position 23, and may comprise, for example, the syringes of a syringe pump of conventional construction. It is understood that this arrangement is for purposes of illustration only, and any supply technique or device may be used. For example only, the channel 26 may be closed at its ends, with liquid supplied to and removed from the channel through openings in the cover 25, or in the base 21, formed at the source position and destination position, respectively. FIG. 2 shows the layout of the regions 30, 31, 32, 35 and 36 on the base surface 28.

Figure 3:
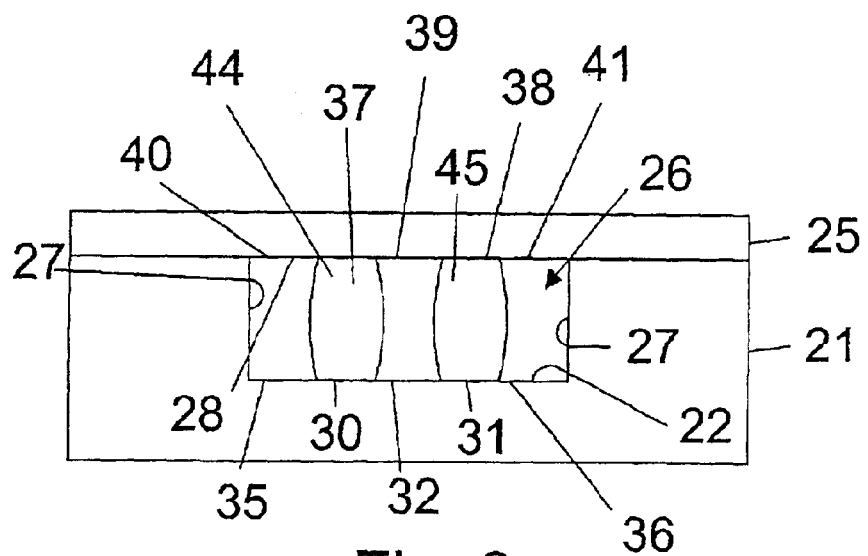
FIG. 3 is a cross-sectional view of the structure of FIG. 1 illustrating parallel flow streams on the structure.
Figure 4:
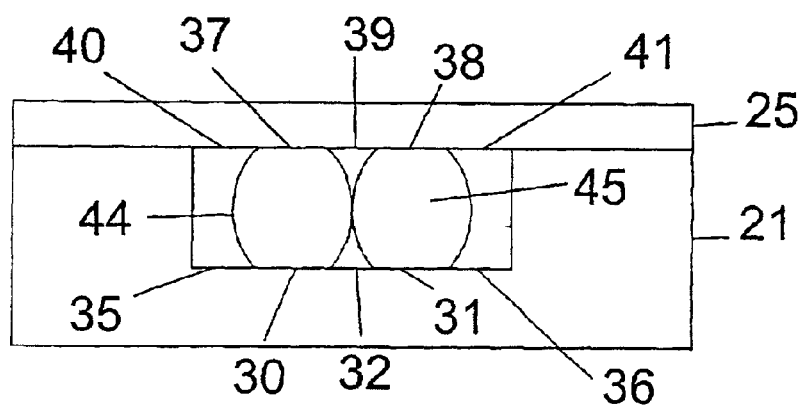
FIG. 4 is a view as in FIG. 3 showing guided flow streams at a higher pressure.

FIG. 3 illustrates the flow of liquid streams 44 and 45 which are confined between the guiding stripes 30 and 37 and between the guiding stripes 31 and 38, respectively. Where the materials of the base 21 and the cover 25 are wettable by the selected liquid which forms the streams 44 and 45, the flow guiding stripes 30, 31, 37 and 38 may be formed as exposed regions of the material of the base and cover surfaces, whereas the adjacent regions 32, 35 and 36 on the base and the regions 39, 40 and 41 on the cover may be formed of a layer of material on the base and cover surfaces which is non-wettable by the selected liquid. As the pressure of the liquid in the flowing streams 44 and 45 is increased, the cross-section of the streams increases to the point where the streams expand and contact each other, as illustrated in FIG. 4. Because the streams 44 and 45 are flowing in smooth laminar flow, without turbulence, the streams 44 and 45 can flow together without mixing with each other, but the contact between the streams will allow diffusion across the interface between the two streams. Such an effect may be exploited for various purposes. Further, as best illustrated in FIG. 3, because the streams 44 and 45 are in contact with a solid only at the guiding stripes 30, 31, 37 and 38, the cross-sectional area to exposed surface area of the streams 44 and 45 is very high—much higher than can be obtained utilizing conventional gas-liquid interface techniques, such as liquid flowing in thin sheets on a wettable surface, liquid flowing confined within a channel, or liquid flowing within walls of a channel formed of a semi-permeable membrane.

Figure 5:
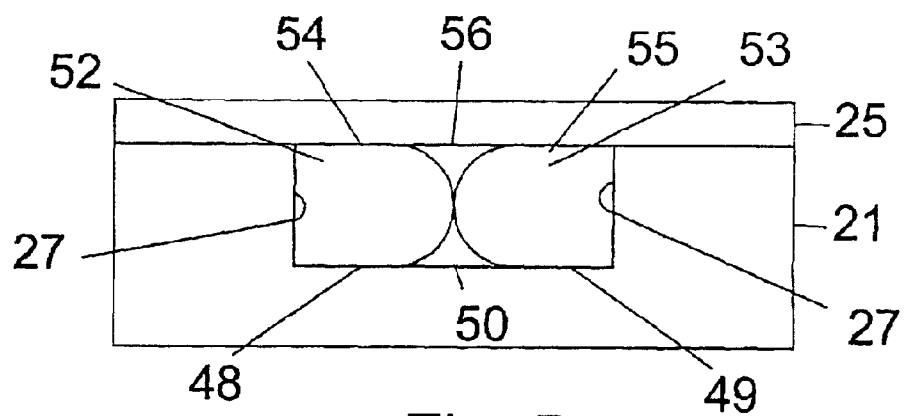
FIG. 5 is a cross-sectional view similar to FIG. 3 showing flow streams guided adjacent to sidewalls of a channel in the structure.

FIG. 5 shows a cross-sectional view of a similar structure in which flow guiding stripes 48 and 49 are formed on the surface 22 of the base 21 (formed as a bottom wall of the channel 26) which are separated by a region 50 which is formed to be non-wettable by the selected liquid. The flow guiding stripes 48 and 49 and sidewalls 27 of the channel 26 are wettable by the selected liquid, so that the streams of flowing liquid 52 and 53 remain in contact with both the sidewalls 27 and the bottom wall 22 at the guiding stripes 48 and 49. Wettable guiding stripes 54 and 55, separated by a non-wettable region 56, are formed on the facing surface 28 of the cover 25, and guide the streams 52 and 53 at the top of the streams. The flow of the liquid streams 52 and 53 under sufficient pressure can expand to provide contact between the two flowing streams 52 and 53 at an interface as illustrated in FIG. 5, allowing diffusion across the interface between the two streams.

The selected liquid which is guided by adjacent, facing wettable stripes in accordance with the invention may be essentially any flowable liquid, including organic as well as inorganic liquids. For example only, the selected liquid may be water or water based liquid solutions. For purposes of simplified terminology, the formation of the guiding stripes and the microfluidic structures in accordance with the invention is described below referring to hydrophobic and hydrophilic surface regions, it being understood that the microfluidic structures of the invention may be formed with materials that have the appropriate surface wetting characteristics with respect to any selected liquid.

The maximum height of the channels under which self-supported liquid streams will be maintained will vary with the characteristics of the flowing liquid and the wettability of the liquid with respect to the flow guiding stripes. Generally, channel heights of 1000 $\mu$m or less are preferred. Exemplary guiding stripe widths may be in the range of 500 $\mu$m, but may be smaller or larger.

Patterning hydrophobic and hydrophilic regions inside microchannels usually requires modifying surface properties in selected areas of a substrate first, followed by aligning and bonding of substrates to form microchannel networks. Such processes, consisting of a series of steps, are complicated and time-consuming. In accordance with the invention, one preferred approach to patterning surface free energies inside channel networks is to combine multiphase liquid laminar flows and self-assembled monolayer (SAM) chemistry. The whole process can typically be carried out within several minutes. Microfluidic flow inside sufficiently small channels is laminar, that is, multiphase liquid streams flow side by side without turbulent mixing, with diffusion across the interface being the only means for mixing of components between two neighboring streams. Multiphase liquid laminar flows have previously been explored to design diffusion-based extractors to fabricate microstructures, and to pattern cells and their environments inside preformed capillaries. See, Kovacs, G. T. A. *Micromachined Transducer Sourcebook*, Boston: McGraw-Hill, 1998; Weigl, B. H., et al., *Science* 1999, 283, 346–347; Kenis, P. J. A., et al. "Microfabrication inside Capillaries using Multiphase Laminar Flow Patterning," *Science* 1999, 285, 83–85; Takayama, S., et al., *Proc. Natl. Acad. Sci. USA* 1999, 96, 5545–5548. SAM is a simple method to modify surface wetting properties of a variety of materials, including silicate substrates, metals and polymers, and it has been extensively studied in terms of mechanisms and applications in the past two decades. See Ulman, A. *An Introduction to Ultrathin Organic Films*, Academic Press: Boston, 1991; Ulman, A., "Formation and Structure of Self-Assembled Monolayers" *Chem. Rev.* 1996, 96, 1533–1554. By controlling the water content in the solvent, SAMs of trichlorosilanes can be formed in a short period of time, e.g., several minutes or less. In the following examples, hexadecane (Aldrich, 99%) was used as a solvent and trichlorosilanes were used to form SAMs on silicate substrates. It was found from contact angle measurement that SAMs with full coverages were formed on glass substrates in less than two minutes.

The channels used were made from glass substrates and glass cover slips as described in Beebe, D. J., et al., *Nature* 2000, 404, 588. When hexadecane and the solution of octadecyltrichlorosilane (OTS) in hexadecane (0.5 w/v %) were brought together in channels by syringe pumps and the laminar flow was maintained for two to three minutes, SAM was formed in the area that trichlorosilane solution flowed through, with the other areas remaining hydrophilic (water advancing contact angle $\theta_a \approx 0°$). Hexadecane and the solution of trichlorosilane in hexadecane (0.5 w/v %) were pumped into channels by two syringe pumps (Harvard Apparatus PHD 2000 Programmable). Syringes were connected to pipet tips fixed to channels by a polydimethylsiloxane (PDMS) tubing. Hexadecane was always brought into channels first and stopped last. The flow rates of solvent and solution were usually the same, either 1 ml/min or 2 ml/min; the flow time was two to three minutes. The channels were then cleaned by sequentially flushing with 10 ml hexane and 10 ml methanol followed by drying with a stream of clean nitrogen. Since the reactivity of trichlorosilane is high, solvent was always introduced into the channel first and stopped last to eliminate the formation of SAM in unwanted areas. The channels were then cleaned by sequentially flushing 10 ml of hexane and 10 ml of methanol followed by drying with a stream of clean air or nitrogen.

Figure 6:
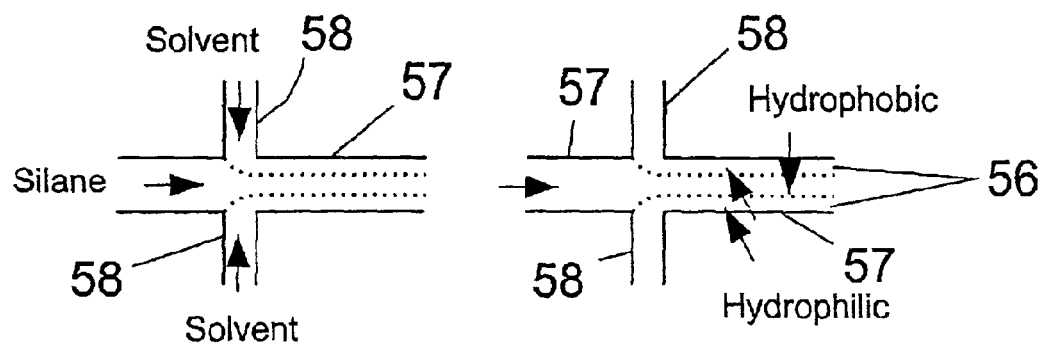
FIG. 6 illustrates the formation of guiding stripes in a channel utilizing streams of a liquid material from which self-assembled monolayers are deposited, confined by a solvent for the material.
Figure 7:
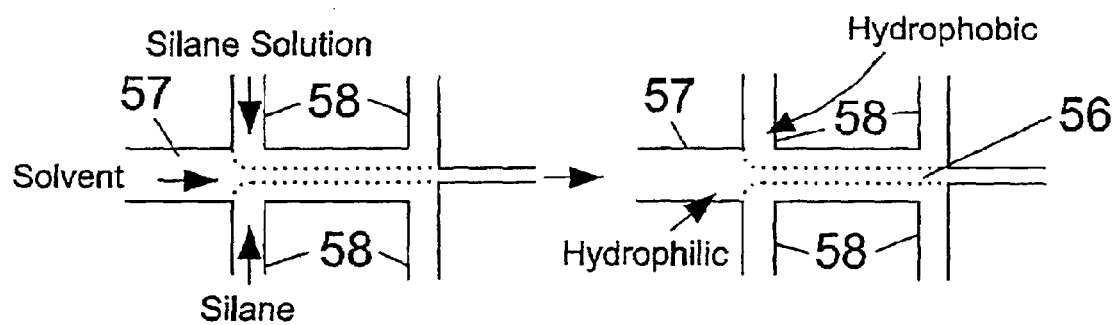
FIG. 7 is a view similar to FIG. 6 illustrating an alternative arrangement of supply of solvent and depositing liquid.
Figure 8:
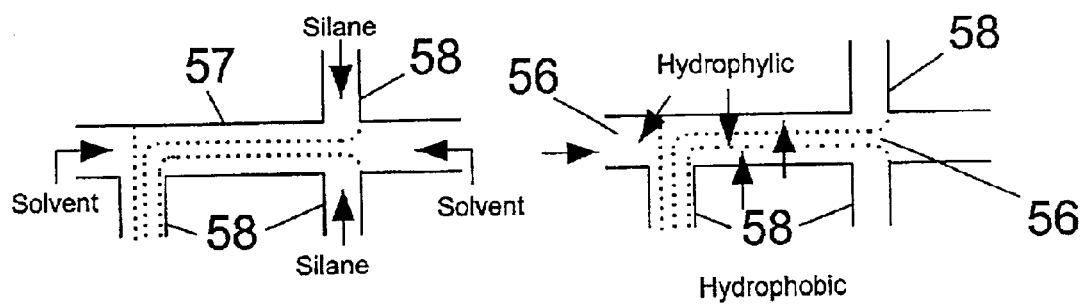
FIG. 8 is a view of the formation of multiple guiding paths utilizing adjacent flowing streams of solvent and liquid from which self-assembled monolayers are deposited.
Figure 9:
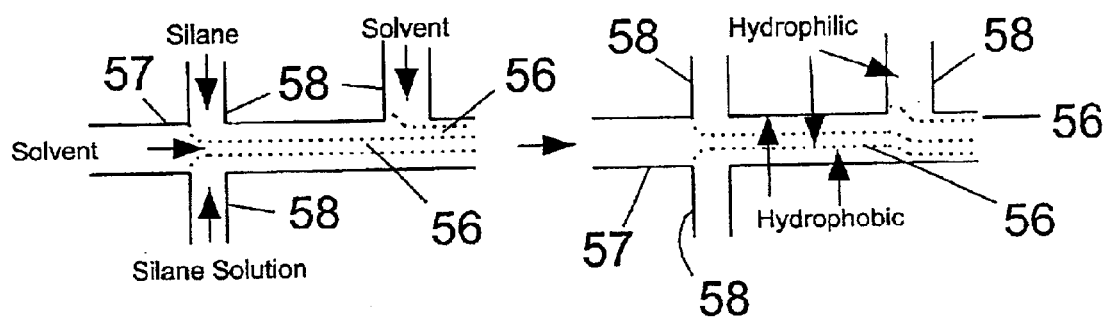
FIG. 9 is a further view illustrating the deposit of multiple flow guiding paths with multiple streams of solvent and liquid material from which self-assembled monolayers are deposited.

A series of hydrophobic and hydrophilic patterns were designed and are shown in FIGS. 6–9. Guiding stripes 56 were formed in a structure as discussed above having a main channel 57 and one or more side channels 58. As expected, aqueous solutions flowed only on designed hydrophilic pathways on the guiding stripes under a pressure below a critical value, and the flow patterns were exactly the same as the solvent in laminar flows. The liquid will gradually retreat back to hydrophilic regions if it accidentally moves into the hydrophobic regions. Using these designs, liquids can be transported from one reservoir (source) to a designated container (destination) without going to other areas, as shown in FIG. 7, and two streams can be brought from two inlets into the channel and transported to a designated reservoir for mixing or reaction as shown in FIGS. 6, 8 and 9. There are no physical walls on the sides of the liquid stream; the walls of the streams themselves, which are maintained by surface tension, may be considered "virtual walls." Laser confocal microscopy was used to examine the vertical shape of virtual walls of a Rodamine B dilute aqueous solution, and it was found that the walls were convex and that the curvature increased with increasing pressure, as illustrated in FIGS. 3 and 4. When the pressure was above a critical value, the solution was no longer confined on hydrophilic pathways 56 and crossed the boundary between hydrophobic and hydrophilic regions. The essential requirement for water crossing the boundary is that the water wetting angle $\theta_a$ of virtual walls is larger than that on the hydrophobic region. The $\theta_a$ of water on SAM of OTS is 112°. When the water surface is curved, the pressures across the surface are different due to surface free energy; the pressure is always greater on the concave side than the pressure on the convex side. This is described by the Young-Laplace equation, $\Delta P=\gamma(1/R_1+1/R_2)$, where $\Delta P$ is the pressure difference, $\gamma$ is the surface free energy of aqueous solution, and $R_1$ and $R_2$ are radii of curvature in vertical and parallel directions relative to channel planes. Since the liquid surface at a certain height in the parallel direction is flat, $R_2$ is indefinite and the equation is simplified as follows: $\Delta P=\gamma/R_1$. Based on the essential condition for water crossing the boundary, $R_1$ can be calculated and expressed by the equation, $R_1 \sin(\theta_a-90°)=h/2$, where h is the channel depth. Therefore, the maximum pressure that virtual walls can stand is expressed by the following equation: $P_{max}=\Delta P=2\gamma \sin(\theta_a-90°)/h$. From this analysis, the maximum pressure is determined by the surface free energy of the aqueous solution $\gamma$, the $\theta_a$ of the aqueous solution on the hydrophobic region, and the channel depth h. This analysis also indicates that virtual walls cannot stand any pressure if the $\theta_a$ of the liquid on the hydrophobic region is smaller than 90°. This prediction was confirmed by use of bromoundecyltrichlorosilane instead of OTS to modify surface wetting property; the water wetting angle $\theta_a$ on SAM of bromoundecyltrichlorosilane is 83°. Carefully adding deionized (DI) water into the channel initially resulted in water being confined on hydrophilic regions; however, a little increase in pressure pushed water to cross the boundary and destroy the virtual walls. For example, for a channel depth of approximately 180 $\mu$m, a surface free energy of DI water of 72.1 mN/m, and $\theta_a$ of DI water on the OTS monolayer of 112°, calculations show that the maximum pressure that virtual walls can stand is 300.09 N/m$^2$, corresponding to a pressure of 30.6 mm water. For SAM of heptadecafluoro-1,1,2,2-tetrahydrodecyltrichlorosilane (HFTS), the $\theta_a$ of DI water is 118°, and the maximum pressure is 376.09 N/m$^2$ (38.4 mm water). The flow pattern design in FIG. 7 was used to measure the maximum pressures that the virtual walls of a DI water stream can stand. Although the measurement was complicated by kinetic issues and high humidity inside the channels, it was observed that bulges developed at a pressure of 31 mm water for OTS patterned channels and 37 mm water for HFTS patterned channels, which were close to theoretical results. A pipet tip (United Laboratory Plastics, 201–1000 $\mu$l pipet tips) with inner diameters of 8 mm at bottom and 6 mm at top was fixed onto channels, and the maximum pressure that the virtual walls can stand was measured by gradually adding deionized water into the pipet and measuring the water height when a bulge developed.

Figure 10:
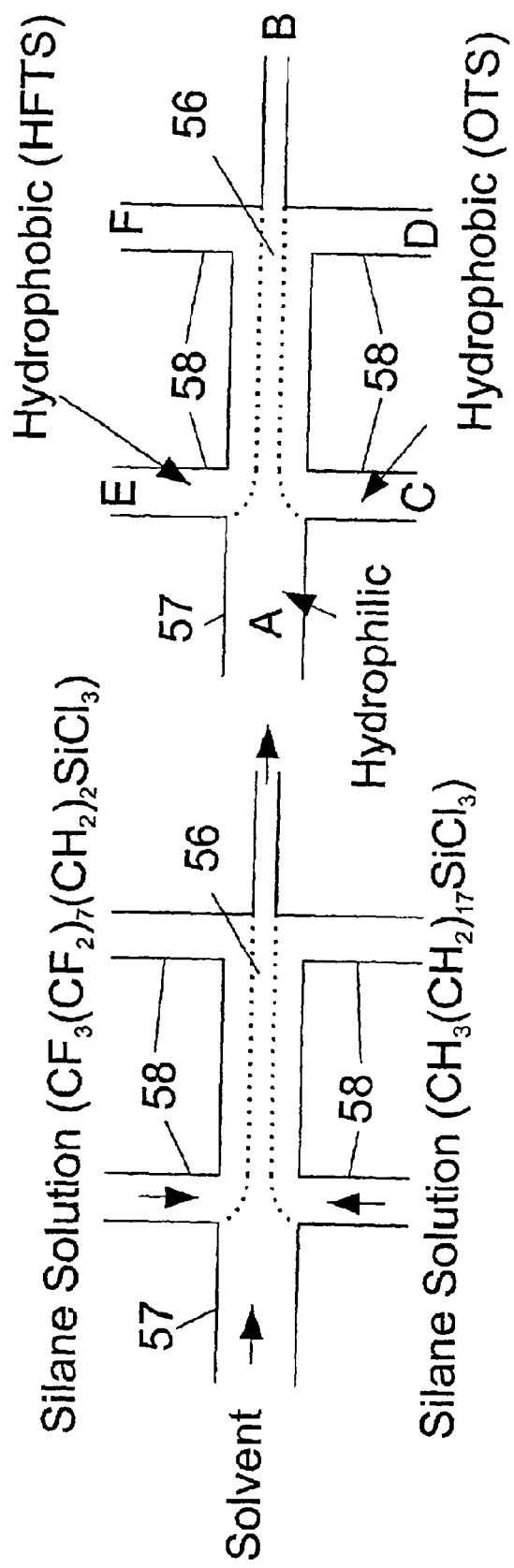
FIG. 10 is a view showing the formation of flow guiding paths using parallel streams of solvent and liquid from which self-assembled monolayers are deposited with an arrangement of channels to provide a structure in which the directionality of the flow of liquid is controlled by the pressure of the liquid.

Based on the maximum pressure differences for OTS monolayer and HFTS monolayer, simple pressure-sensitive virtual valves may be fabricated to manipulate liquid flow direction inside channel networks 57 and 58, as shown in FIG. 10. In this design, the central part 56 is hydrophilic and the other two parts are modified with SAM of OTS and SAM of HFTS. Therefore, the maximum pressures that the two virtual walls of the two liquid streams can stand are different. At a low pressure, for example, 10 mm water, the Rodamine B dilute solution flowed through the central hydrophilic region from A to B. At a medium pressure $P_{OTS}<P<P_{HFTS}$ (e.g., 26 mm water) the virtual wall between the hydrophilic region and the OTS monolayer region was destroyed, leading to water flowing from A to B, C, and D. The surface free energy of Rhodamine B dilute solution is lower than that of deionized water, resulting in a lower maximum pressure. At a higher pressure $P>P_{HFTS}$, aqueous solution flowed through all channels from A to B, C, D, E, and F. Since the wetting angle $\theta_a$ of liquids on hydrophobic regions can be systematically adjusted by use of a mix of SAMS of two or more different trichlorosilanes, and different liquids have different wetting angle $\theta_a$ on one SAM, the liquid flow direction can be changed at any desired pressure. Such virtual valves may thus be used in microfluidic systems and microreactors.

An advantage of the present invention is that the virtual walls provide a large gas-liquid interface area, which enables gas-liquid reactions in microchips. The following is an example of a simple gas-liquid reaction. The aqueous solution confined in hydrophilic pathways was a pH=6.44 phosphate buffer solution containing acid-base indicator methyl red sodium salt. When acetic acid gas was carried into the channels by nitrogen, acetic acid diffused through the interface and reacted with buffer, and the color of the solution changed from yellow to pink. Under the experimental conditions the diffusion was rapid, which was revealed by the moving velocity of the pink color frontline. Gas-liquid and gas-solid reactions are a key component in biological and chemical reagents detectors. The virtual walls of the flow streams controlled in accordance with the invention thus offer a high sensitivity to chemical reagents.

Figure 11:
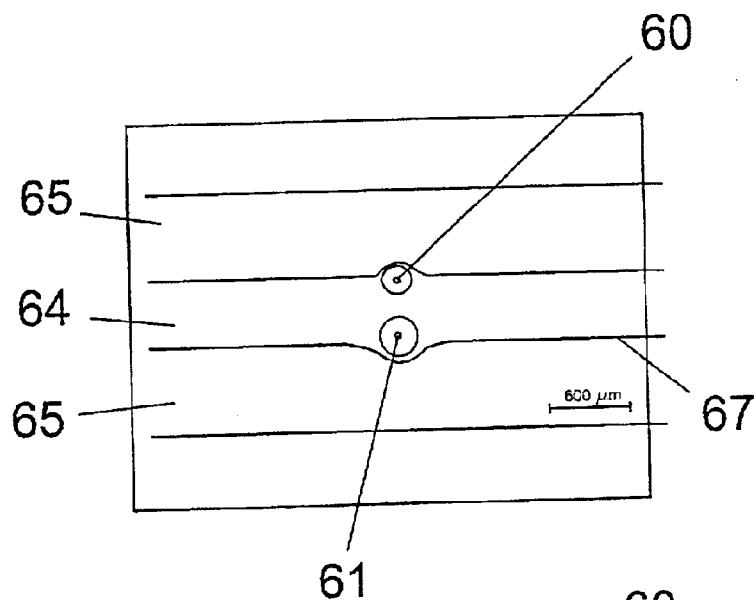
FIG. 11 illustrates flow of liquid on a flow path guided by guiding stripes on which is formed a barrier made of a hydrogel material that reacts with the flowing liquid.
Figure 12:
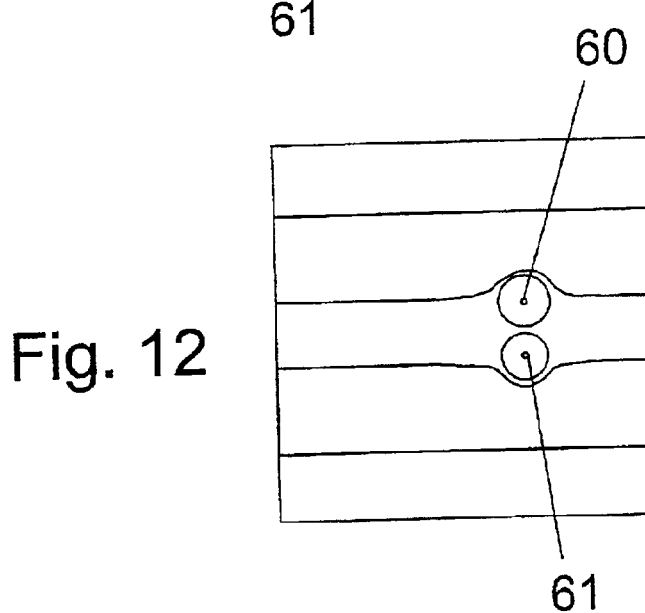
FIG. 12 is a view as in FIG. 11 illustrating the swelling and expansion of the hydrogel barriers to a position at which the flow of liquid on the guiding stripes is blocked.
Figure 13:
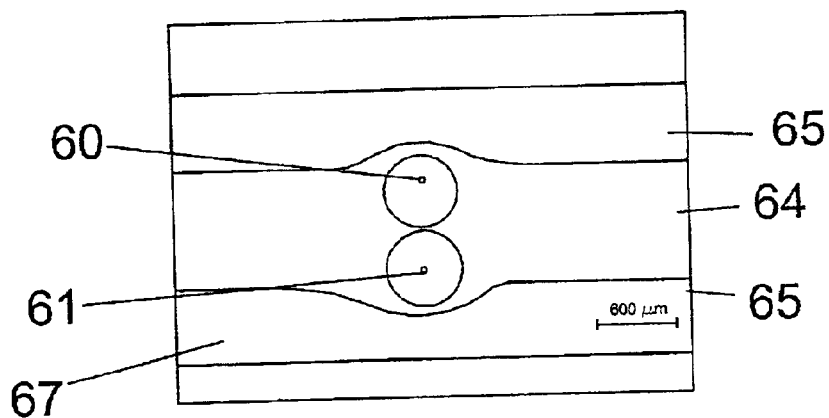
FIG. 13 is a view similar to FIG. 12 illustrating the flow of a liquid around the barrier after a selected pressure of liquid flow has been reached.

By taking advantage of the large surface area of the virtual walls, functions can be achieved on microchips which are difficult by other methods. For example, concentrating samples in microfluidic systems is nontrivial; several methods have been reported in the literature but are not straightforward. The virtual walls of flowing streams in accordance with the invention provide a method to concentrate liquids on microchips, bring dry air or nitrogen through two inlets in the channel design as shown in FIG. 7, and pump solution slowly through hydrophilic pathway to concentrate solutions. The function of lungs in microfluidic systems can be mimicked for exchanging components between a liquid phase and a gas phase. In combination with stimuli-responsive hydrogels, more complex functions may be realized in microfluidic system; for example, a valve as shown in FIGS. 11–13. Two hydrogels barriers 60 and 61 were fabricated in the boundaries of hydrophilic and hydrophobic regions 64 and 65, respectively, defining facing guiding stripes in a channel 67 on a base and a cover. When the solution is acidic, the gels allowed the solution to flow, as shown in FIG. 11. When the solution was basic, the part of the gels in the hydrophilic regions swelled and blocked flow, as shown in FIG. 12. Once the gels were fully swollen and the gel surfaces in hydrophobic regions became hydrophilic, the solution flowed around the gels, as shown in FIG. 13. The time that the gels blocked flow is dependent on the pH value of the solution, the gel compositions, and the ratio of gels in hydrophilic and hydrophobic regions.

Figure 14:
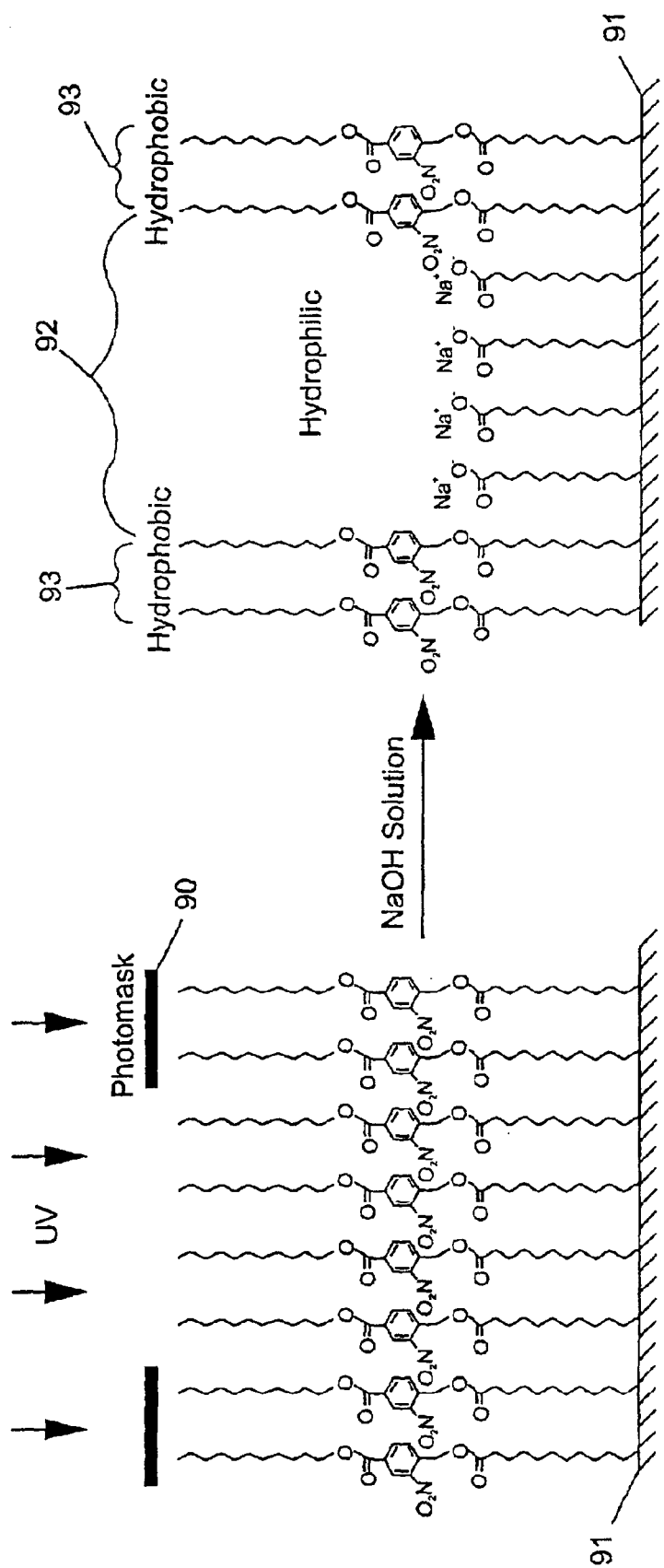
FIG. 14 illustrates the patterning of hydrophilic regions in microchannels utilizing photolithographic techniques.

Pattern formation by multiphase liquid laminar flow as discussed above requires preformed channels, limiting the applicability of this technique to certain potential device applications. An alternative technique is the use of photolithography to pattern surface free energies inside microchannels. A photopatternable material is applied to the bottom wall of a channel in a base and is then photolithographically patterned to form wettable and non-wettable regions to define a guiding stripe or stripes. Similar photopatterning can be carried out on the cover. As an example, the photochemistry of the 2-nitrobenzyl group (see, e.g., D. H. Rich, et al., J. Am. Chem. Soc., Vol. 97, 1975, pp.1575, et seq.; V. N. R. Pillai, Synthesis, 1980) can be used to synthesize photocleanable SAMs, as illustrated in FIG. 14. Ultraviolet (or other wavelength) radiation passed through a masks 90 placed on top of a photopolymer, e.g., SAM-modified, channel bottom walls 91 results in the production of hydrophilic carboxyl in the irradiated regions 92, with the non-irradiated regions 93 remaining hydrophobic. Aqueous solutions will tend to be confined to the irradiated regions 92. Other photopatternable chemistry may also be utilized. Such photopatterning provides flexibility in the design and generation of complex flow patterns and facilitates mass manufacturing of surface directed flow devices. A matching pattern may be formed by the same photochemistry techniques on the facing surface of the cover, which is then mounted onto the base in proper position so that the flow guiding stripes on the cover and base are adjacent to and face each other. The microchannels were cleaned by sequentially flushing with 10 ml hexane and 10 ml methanol after monolayer deposition from a 0.5 w/w % solution of the corresponding trichorosilane in hexadecane and then dried with a stream of nitrogen. A photomask was placed on top of the SAM-coated channel filled with pH=11.77 NaOH solution. The UV light source was an Olympus Epi-Fluorescent Microscope (BX-60) passed through a near UV filter cube (U-MNUA, type BP 360–370 nm) with 360–370 nm band pass. A 2x magnification lens was used and the irradiation time was 90 minutes. After irradiation, the channel was rinsed with 10 ml of methanol and then dried with a stream of clean air. A dilute Rhodamine B aqueous solution was added into the channels by a syringe and a pressure was applied to push the solution slowly through the hydrophobic region. When the aqueous solution reached the edge of the irradiated area, it wetted the hydrophilic region spontaneously and formed patterns identical to the photomask.

Liquids of the same or similar nature such as aqueous-aqueous solutions or hexadecane-hexadecane (HD) solutions exhibit stable laminar flow inside microchannels. This liquid behavior has been successfully used in microfluidic diffusion-based separation and detection, fabrication of various microstructures, and patterning surface free energies inside microchannels. Few studies have been reported on the flow behavior of immiscible liquids at the microscale. Owing to the different viscosities, densities, and interfacial free energies between such liquids, the flow behavior of immiscible liquids were observed to be different from liquids of the same or similar natures. Control of the flow is nontrivial, and separation of immiscible liquids is difficult once they are in contact. The present invention may be utilized to control the flow of immiscible liquids in microchannels by patterning surface free energies, and can be applied to the fabrication of a semipermeable membrane. An example of the invention carried out in this manner is given below.

Channels were made from "Piranha"-treated glass slides and cover slips, and were coated with a photocleavable SAM of 2,2,3,3,4,4,5,5,6,6,7,7,8,8,8-pentadecafluoro-1-octyl 4-(11-trichlorosilyl-1-oxoundecyloxymethyl)-3-nitrobenzoate (F-SAM). A photomask and a UV light were employed to pattern the surface free energies. Upon exposure to UV irradiation, the o-nitrobenzyl-oxygen bond in F-SAM is cleaved, and the surface becomes hydrophilic. Aqueous solutions introduced to the surface-patterned channel flow only along the hydrophilic pathway when the pressure is maintained below a critical value. However, organic liquids such as HD are not confined to either the hydrophilic or hydrophobic regions. This is consistent with the fact that the advancing contact angles of these organic liquids in air ($\theta_{org/air}$) on both hydrophobic and hydrophilic regions are smaller than 90°. By first introducing an aqueous solution in the hydrophilic region, HD and some other organic liquids subsequently introduced are confined to the hydrophobic region while aqueous solutions are confined to the hydrophilic region, provided the pressures are maintained below critical values. Since organic liquids are not confined to the hydrophobic region without an aqueous solution first filling the hydrophilic region, the organic liquids can be considered as being confined by liquid walls.

Figure 16:
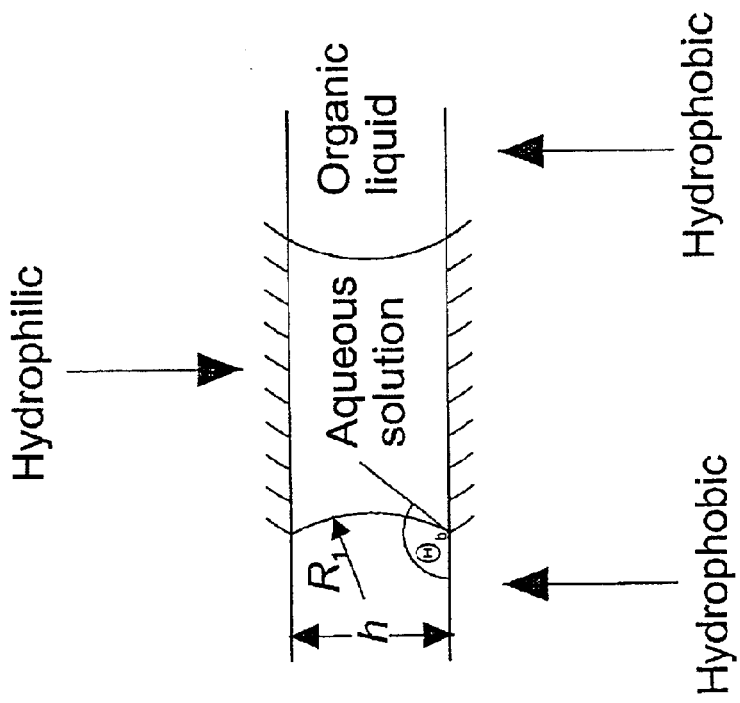
FIG. 16 is a diagram illustrating the angle of curvature $\theta_b$ when a pressure is applied to an organic liquid adjacent to an aqueous liquid.
Figure 15:
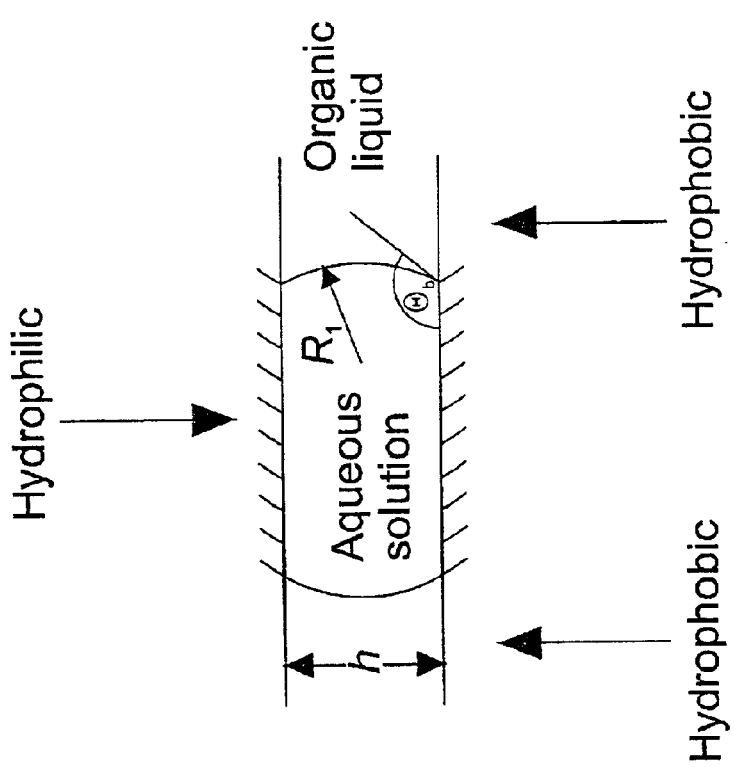
FIG. 15 is a diagram illustrating the angle of curvature $\theta_b$ when a pressure is applied to an aqueous solution adjacent to an organic liquid.

The interface of $H_2O$ (or an aqueous solution) and organic liquid is pinned precisely at the boundary between the hydrophilic and hydrophobic surface patterns. If a pressure is applied to $H_2O$, the interface will curve toward the organic phase as shown in FIG. 15, and vice versa if a pressure is applied to the organic liquid as shown in FIG. 16. Critical conditions for liquid wall rupture will occur when the angle of curvature, $\theta_b$, equals the advancing contact angle of $H_2O$ on the hydrophobic surface covered in the organic liquid ($\theta_{water/org}$) (if the pressure is applied to $H_2O$) or the advancing contact angle of the organic liquid on the hydrophilic surface covered in water ($\theta_{org/water}$) (if the pressure is applied to the organic phase). When a liquid-liquid interface is curved, there is a pressure drop across the interface. This is described by the Young-Laplace equation, $\Delta P=\gamma(1/R_1+1/R_2)$, where $\Delta P$ is the pressure difference, $\gamma$ is the liquid-liquid interfacial tension, $R_1$ and $R_2$ are the radii of curvature in directions vertical and parallel to the liquid stream. For a straight stream, the equation is simplified to $\Delta P=\gamma/R_1$ and since $R_1$ can be expressed by the equation, $R_1=h/[2\sin(\theta_b-90°)]$, where h is the channel depth (~180 $\mu$m), the maximum pressures that liquid walls can sustain in a straight stream are $P_{water/org}=(2\gamma/h)\sin(\theta_{water/org}-90°)$ above which $H_2O$ flows into the hydrophobic region and $P_{org/water}=(2\gamma/h)\sin(\theta_{org/water}-90°)$ above which the organic liquid flows into the hydrophilic region. Obviously, $\theta_{water/org}$ and $\theta_{org/water}$ must be greater than 90° to confine $H_2O$ in the hydrophilic region and organic liquids in the hydrophobic region. We have measured $\theta_{water/org}$ on a F-SAM and $\theta_{org/water}$ on a UV-irradiated F-SAM. The experimentally determined maximum pressures that liquid walls can withstand are in good agreement with the calculated values by use of the independently measured values of $\theta_{water/org}$ and $\theta_{org/water}$ and the liquid-liquid interfacial tensions.

In comparison to multistream laminar flow, the ability to confine organic liquids to hydrophobic regions and aqueous solutions to hydrophilic regions makes it practical in accordance with the invention to manipulate immiscible liquids inside microchannels. For example, one liquid can remain static while the other liquid is flowing and the boundary remains constant. Moreover, two immiscible liquids can flow in the same direction (concurrent flow) or in opposite directions (countercurrent flow) while maintaining a stationary boundary. In contrast to laminar flow, the width ratio of the two streams is not determined by the relative flow velocities but rather by the width ratio of hydrophobic and hydrophilic pathways provided the pressure is subcritical. Countercurrent flow is widely adopted in nature for efficient mass transfer such as gas exchange between air and blood in bird lungs and between water and blood in fish gills.

Figure 18:
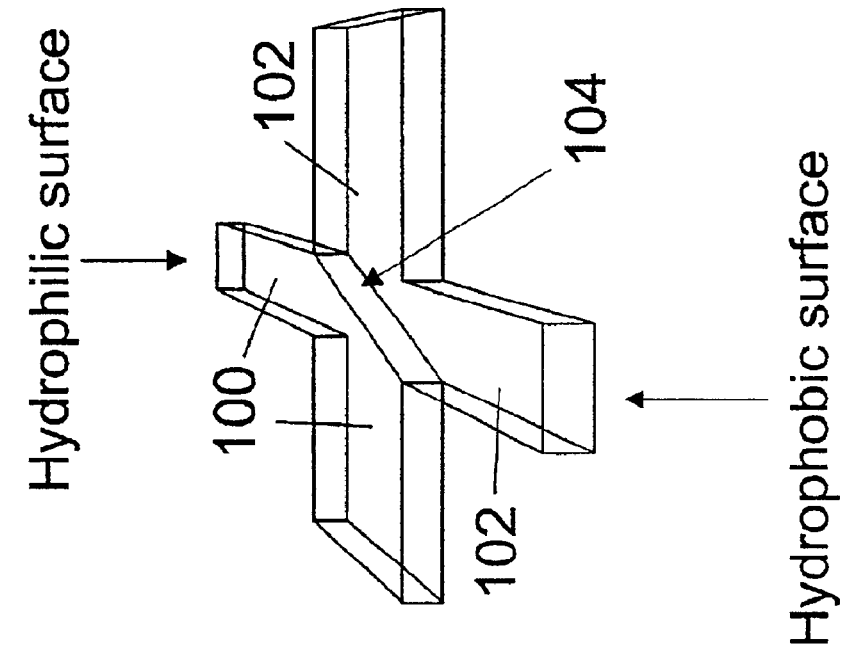
FIG. 18 is a schematic illustration of a polymer membrane fabricated inside the channel of FIG. 17 by interfacial polymerization.
Figure 17:
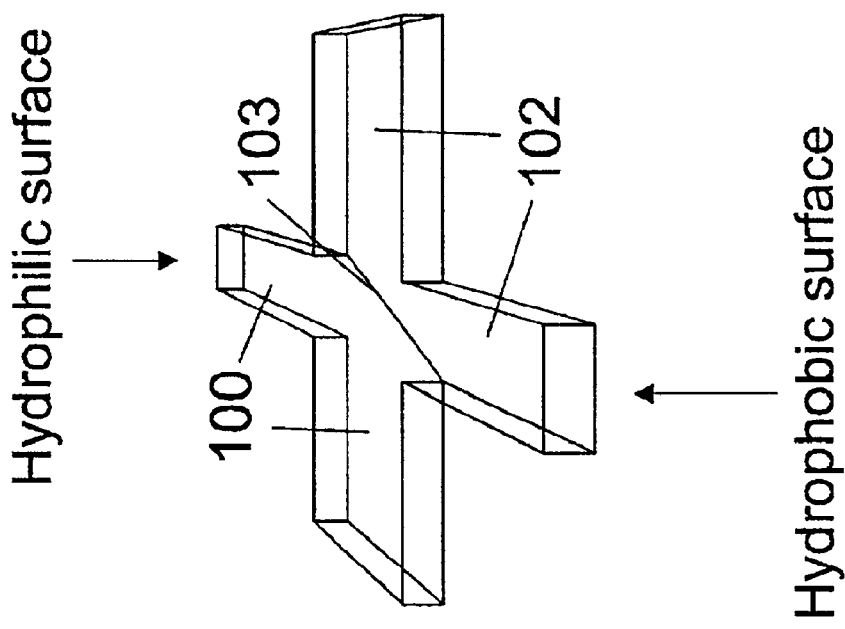
FIG. 17 is a schematic illustration of a surface patterned channel with contacting streams of aqueous and organic liquids.

In the present invention, liquid walls may be utilized to conduct an interfacial polymerization in a surface-patterned channel to fabricate a semipermeable membrane, as illustrated by the following example. An F-SAM coated channel was photopatterned as illustrated in FIG. 17 to provide a hydrophillic surface region 100 and a hydrophobic surface region 102, with a boundary 103 at which the two regions meet. An aqueous solution containing hexamethylenediamine (62.5 mM) was brought into the hydrophilic region 100 followed by introduction of a solution of adipoyl chloride in xylenes (46.9 mM) into the hydrophobic region 102. Interfacial polymerization occurred immediately when the two phases made contact at the boundary 103, producing a polymer film at the hydrophilic-hydrophobic boundary as shown at 104 in FIG. 18. The polymerization proceeded at room temperature for 8 min at which point the organic solution was flushed out of the channel with xylenes and the aqueous solution was flushed out of the channel with methanol. Both sides of the membrane were then rinsed with 10 mL methanol, and dried with nitrogen. Membrane permeability was studied on an Olympus fluorescent microscope BX 60 using an aqueous suspension of 0.2 μm fluorescent microspheres. The suspension was injected into the hydrophilic region and was retained by the membrane under ambient conditions. When a pressure was applied to the aqueous solutions can flow in spontaneously. The channel was sequentially flushed with 10 mL deionized water and 10 mL methanol, and then dried with a stream of clean air. In a watch glass was placed a piece of F-SAM-coated cover slip. 0.1 M HCl solution was filled into the space between the cover glass and the watch glass. After irradiation under the same conditions as for channels, the cover glass was rinsed with methanol, acetone, and methanol, and then dried with a stream of air. Contact angle measurement showed that the advancing contact angle of $H_2O$ in air ($\theta_{water/air}$) on the UV-irradiated F-SAM decreased from 118° to 67°. The advancing contact angles of hexadecane on F-SAM and the UV-irradiated F-SAM are 74° and 18°, respectively.

2. Pipette tips with inner diameters of 8 mm at the bottom and 6 mm at the top were fixed onto a hydrophilic outlet and a hydrophobic outlet. The maximum pressure $P_{water/org}$ was determined by gradually adding deionized water into the tip fixed to the hydrophilic region and measuring water height when the interface started moving. $P_{org/water}$ was determined by gradually adding organic liquid into the tip fixed to hydrophobic region and measuring organic liquid height when the interface started moving.

3. Advancing contact angles were measured by use of a Rame Hart NRL contact angle goniometer (Model 100-00) with a microsyringe attachment. For measurement of $\theta_{water/org}$, A F-SAM coated cover glass was immersed in a 5 mm deep organic liquid, a water drop was brought into contact with F-SAM, and the advancing value was determined by adding water into the drop. For $\theta_{org/water}$, a UV-irradiated F-SAM coated cover glass was immersed in water, an organic liquid drop was brought into contact with the surface by microsyringe, and advancing value was determined by adding liquid into the drop.

4. Table 1 provides a comparison of the calculated maximum pressures and experimental results.

TABLE 1

Comparison of the calculated maximum pressures and experimental results*

| | $\theta_{water/org}$ | $\theta_{org/water}$ | $\gamma$ (mN/m) | $P_{water/org}^C$ (N/m$^2$) | $P_{org/water}^C$ (N/m$^2$) | $P_{water/org}^E$ (N/m$^2$) | $P_{org/water}^E$ (N/m$^2$) |
|---|---|---|---|---|---|---|---|
| Hexadecane | 143 ± 3° | 123 ± 2° | 52.5$^1$ | 466 | 318 | 507 | 326 |
| Cyclohexane | 149 ± 3° | 123 ± 2° | 50.2$^2$ | 478 | 304 | 461 | 267 |
| Toluene | 146 ± 3° | 104 ± 2° | 37.5$^2$ | 345 | 101 | 294 | 127 |
| Xylenes | 150 ± 4° | 110 ± 1° | 37.5$^3$ | 361 | 143 | 304 | 177 |
| Chloroform | 149 ± 2° | 86 ± 2° | 32.0$^1$ | 305 | 0 | — | 0$^\dagger$ |

*$P_{water/org}^C$, $P_{org/water}^C$: the calculated maximum pressures by use of the independently determined values of $\theta_{water/org}$ and $\theta_{org/water}$ and the liquid-liquid interfacial tensions. $P_{water/org}^E$, $P_{org/water}^E$: the experimental results.
$^\dagger$Chloroform was found not to be confined to the hydrophobic region suspension, water gradually passed through the membrane while microspheres remained behind and became concentrated in the vicinity of the membrane. This indicated that the membrane's pore size is below 200 nm.

The following are the procedures utilized in the example given above.

1. A photomask was placed on top of an F-SAM coated channel filled with 0.1 M HCl, and a cover slip was placed on top of photomask to ensure it flat. The UV intensity of Novacure systems (EFOS, Model N2001-A1) was preset at 5600 mW/cm$^2$, the distance between the lens and the channel was 40 mm, and the irradiation area was 20 mm in diameter. The irradiation time was 6 min. The introductory pathways on the two ends were also irradiated such that 5. The aqueous suspension of 0.2 μm carboxylate-modified microspheres (yellow-green fluorescent, 505/515) was purchased from Molecular Probes, and was diluted with 2×volume of deionized water before used for permeability study. The fluorescent image was taken by use of WIBA cube and a 365 nm UV light.

It is understood that the invention is not confined to the particular embodiments disclosed herein as illustrative, but embraces all such forms thereof as come within the scope of the following claims.

What is claimed is:

1. A microfluidic flow guiding structure comprising:

(a) a base having a surface;

(b) a cover having a surface facing the base surface and spaced from the base surface by 1000 μm or less;

(c) adjacent facing regions on the base surface and cover surface defining a flow path from a source position to a destination position on the base surface and cover surface, at least a region on each of the base surface and cover surface being wettable by and having a wetting angle of less than 90° with respect to a selected liquid, the wettable region on at least one of the base surface and cover surface formed as a flow guiding stripe and a region adjacent to the guiding stripe on the at least one of the base surface and cover surface being non-wettable by and having a wetting angle of greater than 90° with respect to the selected liquid wherein the base and cover are formed of a material which has a wetting angle less than 90° with respect to the selected liquid, and wherein each guiding stripe is defined on an exposed surface of the material forming the base or cover, and wherein the regions adjacent to each guiding stripe is formed of a layer of material differing from the material of the base or cover and that has a wetting angle with respect to the selected liquid of greater than 90°, wherein the layer of material is a self-assembled monolayer of a trichlorosilane and the material of the base and cover is silicate glass, and the trichlorosilane is selected from the group consisting of octadecyl-trichlorosilane and heptadecaflouro-1,1,2,2-tetrahydrodecyltrichlorosilane.

2. The microfluidic flow guiding structure of claim 1 wherein each of the base surface and cover surface have a wettable flow guiding stripe thereon and a non-wettable region adjacent to the flow guiding stripe.

3. The microfluidic flow guiding structure of claim 1 wherein the selected liquid is water and each guiding stripe is wettable by water and the region adjacent to each guiding stripe is non-wettable by water.

4. The microfluidic flow guiding structure of claim 1 wherein there are regions on the base surface and the facing cover surface defining at least two parallel flow guiding stripes on the base and cover surfaces that are wettable by the selected liquid which are separated by a region that is not wettable by the selected liquid.

5. The microfluidic flow guiding structure of claim 1 wherein each wettable flow guiding stripe has regions adjacent thereto on two sides of the guiding stripes that are non-wettable by the selected liquid.

6. The microfluidic flow guiding structure of claim 1 wherein there is a region on one side of each wettable flow guiding stripe that is non-wettable by the selected liquid and wherein there is a vertical sidewall extending between the base and cover surfaces at another side of the stripe.

7. The microfluidic flow guiding structure of claim 6 wherein the vertical sidewall is formed of a material that is wettable by the selected liquid.

8. The microfluidic flow guiding structure of claim 1 further including means for pumping liquid onto the flow guiding stripe region.

9. The microfluidic flow guiding structure of claim 8 wherein the means for pumping liquid comprises a syringe pump.

10. The microfluidic flow guiding structure of claim 1 wherein the base includes a main channel having a bottom wall and two sidewalls, the cover extending over the main channel, a flow guiding stripe on the base formed on the bottom wall of the main channel and an adjacent flow guiding stripe of the cover formed on the cover surface facing the bottom wall of the main channel, and the non-wettable region adjacent to the flow guiding stripe on the base also formed on the bottom wall of the main channel.

11. A microfluidic flow guiding structure comprising:
(a) a base having a surface;
(b) a cover having a surface facing the base surface and spaced from the base surface by 1000 μm or less;
(c) adjacent facing regions on the base surface and cover surface defining a flow path from a source position to a destination position on the base surface and cover surface, at least a region on each of the base surface being wettable by and having a wetting angle of less than 90° with respect to a selected liquid, the wettable region on at least one of the base surface and cover surface formed as a flow guiding stripe and a region adjacent to the guiding stripe on the at least one of the base surface and cover surface being non-wettable by and having a wetting angle of greater than 90° with respect to the selected liquid, wherein the base includes a main channel having a bottom wall and two sidewalls, the cover extending over the main channel, a flow guiding stripe on the base formed on the bottom wall of the main channel and an adjacent flow guiding stripe of the cover formed on the cover surface facing the bottom wall of the main channel, and the non-wettable region adjacent to the flow guiding stripe on the base also formed on the bottom wall of the main channel, and further including at least one side channel having a bottom wall and two sidewalls, the cover extending over the at least one side channel and having a surface spaced from and facing the bottom wall of the side channel, the at least one side channel intersecting the main channel, a flow guiding stripe formed on the bottom wall of the side channel and an adjacent facing flow guiding stripe formed on the cover surface that are wettable by the selected liquid, and a region on the bottom wall of the side channel and on the facing cover surface adjacent to the flow guiding stripes in the side channel being non-wettable by the selected liquid, the flow guiding stripes in the side channel intersecting and joining the flow guiding stripes in the main channel.

12. The microfluidic flow guiding structure of claim 11 wherein there are two side channels each having bottom walls and two sidewalls and facing surfaces of the cover spaced from the bottom walls of the side channels, the side channels intersecting the main channel on opposite sides of the main channel, wherein there are two flow guiding stripes formed on the bottom wall of the main channel and two facing flow guiding stripes formed on the cover surface that are each separated by a region that is not wettable by the selected liquid, and wherein the flow guiding stripes of one of the side channels is joined to a first of the flow guiding stripes in the main channel and the flow guiding stripes of the other side channel are joined to a second of the flow guiding stripes in the main channel.

13. The microfluidic flow guiding structure of claim 12 wherein the width of the main channel between the sidewalls of the main channel and the height of the main channel between the bottom wall and cover surface are less than 1,000 μm.

14. The microfluidic flow guiding structure of claim 13 wherein the base and cover are formed of a silicate glass.

15. The microfluidic flow guiding structure of claim 1 including a barrier formed between flow guiding stripes formed on the base and cover surface to block flow thereon below a pressure level above which liquid on the guiding stripes will flow around the barrier.

16. The microfluidic flow guiding structure of claim 15 wherein the barrier is formed of hydrogel that reacts to selected conditions in the selected liquid to swell to block the flow of liquid.

17. A microfluidic flow guiding structure comprising:
(a) a base having a surface;
(b) a cover having a surface facing the base surface and spaced from the base surface;
(c) adjacent facing regions on the base surface and cover surface defining a flow path from a source position to a destination position on the base surface cover surface, one region on each of the base surface and cover surface formed as a flow guiding stripe and being wettable by and having a welling angle of less than 90° with respect to a selected liquid, and a region adjacent to the guiding stripe on each of the base surface and cover surface being non-wettable by and having a wetting angle of greater than 90° with respect to the selected liquid, wherein the base and cover are formed of a material which has a wetting angle less than 90° with respect to the selected liquid, and wherein the guiding stripes are defined on the surfaces of the base and cover as an exposed surface of the material forming the base and cover, and wherein the regions adjacent to the guiding stripes are formed of a layer of material differing from the material of the base or cover and that has a wetting angle with respect to the selected liquid of greater than 90°, wherein the layer of material in the regions adjacent to the guiding stripes is formed of a self-assembled monolayer of a trichlorosilane and the material of the base and cover is silicate glass, and wherein the trichlorosilane is selected from the group consisting of octadecyltrichlorosilane and heptadecafluoro-1,1,2,2-tetrahydrodecyltrichlorosilane.

18. The microfluidic flow guiding structure of claim 17 wherein the cover surface is spaced from the base surface by 1000 μm or less.

19. The microfluidic flow guiding structure of claim 17 wherein the selected liquid is water and the guiding stripes on the base surface and the cover surfaces are wettable by water and the regions adjacent to the guiding stripes are non-wettable by water.

20. The microfluidic flow guiding structure of claim 17 wherein there are regions on the base surface and the facing cover surface defining at least two parallel flow guiding stripes on the base and cover surfaces that are wettable by the selected liquid which are separated by a region that is not wettable by the selected liquid.

21. The microfluidic flow guiding structure of claim 17 wherein the wettable flow guiding stripes on the base and cover surfaces have regions adjacent thereto on two sides of the guiding stripes that are non-wettable by the selected liquid.

22. The microfluidic flow guiding structure of claim 17 wherein there is a region on one side of the wettable flow guiding stripes on the base and cover surfaces that is non-wettable by the selected liquid and wherein there is a vertical sidewall extending between the base and cover surfaces at another side of the stripes.

23. The microfluidic flow guiding structure of claim 22 wherein the vertical sidewall is formed of a material that is wettable by the selected liquid.

24. The microfluidic flow guiding structure of claim 23 further including means for pumping liquid onto the adjacent flow guiding stripe regions on the base and cover surfaces.

25. The microfluidic flow guiding structure of claim 24 wherein the means for pumping liquid comprises a syringe pump.

26. The microfluidic flow guiding structure of claim 24 including a barrier formed between the guiding stripes on the base and cover to block flow thereon below a pressure level above which liquid on the guiding stripes will flow around the barrier.

27. The microfluidic flow guiding structure of claim 26 wherein the barrier is formed of hydrogel that reacts to selected conditions in the selected liquid to swell to block the flow of liquid.

28. A method of forming a microfluidic flow guiding structure comprising:
(a) forming a channel in a base and a cover, the channel having a bottom wall and two vertical sidewalls in the base and a surface of the cover spaced from and facing the bottom wall, the height of the channel between the bottom wall and the facing cover surface being 1,000 μm or less;
(b) injecting into the channel at least two parallel streams of liquid and flowing them together in the channel in adjacent laminar flow in contact with the bottom wall and the cover surface, one of the liquids being a solvent which does not affect the surface of the bottom wall of the channel and the cover surface and the other of the liquids being material that deposits a self-assembled monolayer onto the surface of the bottom wall of the channel and the cover surface over which the stream of liquid passes, the material of the bottom wall of the channel and of the cover surface being wettable by a selected liquid and the self-assembled monolayer deposited on the surfaces being non-wettable by the selected liquid.

29. The method of claim 28 wherein the stream of material that deposits a self-assembled monolayer is a trichlorosilane in a solution with a solvent.

30. The method of claim 29 wherein the stream of solvent is liquid hexadecane and wherein the stream of liquid that deposits a self-assembled monolayer is a solution of a trichlorosilane and hexadecane.

31. The method of claim 30 wherein the trichlorosilane is selected from the group consisting of octadecyltrichlorosilane and heptadecafluoro-1,1,2,2-tetrahydrodecyltrichlorosilane.

32. The method of claim 28 wherein the channel is a main channel and further including forming at least one side channel that intersects the main channel, the at least one side channel having a bottom wall and two vertical sidewalls and a cover surface facing the bottom wall, the width of the side channel between the sidewalls and the height of the channel between the bottom wall and cover surface being 1,000 μm or less, and injecting into the side channel at least two parallel streams of liquid and flowing them together in the side channel in adjacent laminar flow, one of the liquids being a solvent which does not affect the surfaces of the bottom wall and the cover surface of the side channel and the other of the liquids being material that deposits a self-assembled monolayer onto the surfaces of the bottom wall and cover surfaces of the side channel that is non-wettable by the selected liquid, the streams of liquid in the side channel intersecting with and joining the parallel streams of liquid flowing together in the main channel.

33. A method of guiding microfluidic flows of liquid comprising:
(a) providing a micromachined flow guiding structure having a base having a surface and a cover with a surface facing the base surface, the cover surface spaced from the base surface, adjacent facing regions on the base surface and cover surface defining a flow path from a source position to a destination position on the base and cover surfaces, a region on at least one of the base and cover surfaces formed as a flow guiding stripe wettable by and having a wetting angle of less than 90° with respect to a first liquid, and a region adjacent to the guiding stripe being non-wettable by and having a wetting angle of greater than 90° with respect to the selected liquid;

(b) injecting the selected liquid onto the flow guiding stripe;

(c) injecting a second liquid onto the regions adjacent to the guiding stripes and in contact with the first liquid, the second liquid being immiscible with the first liquid and non-wettable with respect to the guiding stripes.

34. The method of claim 33 wherein the first and second liquids polymerize when in contact to form a polymer layer between the two liquids where they contact.

35. The method of claim 33 wherein the first liquid is water or a water based solution and the second liquid is an organic liquid immiscible with water.

36. The method of claim 33 wherein the cover surface is spaced from the base surface by 1000 µm or less.

* * * * *

UNITED STATES PATENT AND TRADEMARK OFFICE
CERTIFICATE OF CORRECTION

PATENT NO. : 6,821,485 B2
DATED : November 23, 2004
INVENTOR(S) : David J. Beebe, Jeffrey S. Moore and Bin Zhao It is certified that error appears in the above-identified patent and that said Letters Patent is hereby corrected as shown below:

Column 15,
Line 12, delete the phrase "having a welling angle" and replace it with -- having a wetting angle --.

Signed and Sealed this

Sixth Day of September, 2005

JON W. DUDAS
*Director of the United States Patent and Trademark Office*